US008619979B2

(12) United States Patent
Ficke et al.

(10) Patent No.: US 8,619,979 B2
(45) Date of Patent: Dec. 31, 2013

(54) PHYSICALLY UNCLONABLE FUNCTION IMPLEMENTED THROUGH THRESHOLD VOLTAGE COMPARISON

(75) Inventors: Joel T. Ficke, Madison, WI (US); William E. Hall, Hawthorne, NY (US); Terence B. Hook, Essex Junction, VT (US); Michael A. Sperling, Poughkeepsie, NY (US); Larry Wissel, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 12/823,278

(22) Filed: Jun. 25, 2010

(65) Prior Publication Data

US 2011/0317829 A1 Dec. 29, 2011

(51) Int. Cl.
G06F 21/73 (2013.01)
H04L 9/08 (2006.01)

(52) U.S. Cl.
CPC . *G06F 21/73* (2013.01); *H04L 9/08* (2013.01); *H04L 9/0866* (2013.01)
USPC .......................................................... 380/44

(58) Field of Classification Search
CPC ...................................................... G06F 21/73
USPC ............................................................ 380/44
See application file for complete search history.

(56) References Cited

U.S. PATENT DOCUMENTS

| 6,161,213 | A | 12/2000 | Lofstrom | |
|---|---|---|---|---|
| 6,885,250 | B1 * | 4/2005 | Le et al. | 330/311 |
| 7,681,103 | B2 | 3/2010 | Devadas | |
| 7,941,673 | B1 * | 5/2011 | Trimberger | 713/189 |
| 2003/0042938 | A1 * | 3/2003 | Shvarts | 327/108 |
| 2009/0296780 | A1 * | 12/2009 | Lee et al. | 374/178 |
| 2010/0085075 | A1 | 4/2010 | Luzzi et al. | |
| 2010/0127822 | A1 * | 5/2010 | Devadas | 340/5.8 |
| 2010/0225638 | A1 * | 9/2010 | David et al. | 345/214 |
| 2012/0072476 | A1 | 3/2012 | Bucci et al. | |

\* cited by examiner

*Primary Examiner* — Ashok Patel
*Assistant Examiner* — Alexander Lagor
(74) *Attorney, Agent, or Firm* — Toler Law Group

(57) ABSTRACT

Electronic devices and methods are disclosed to provide and to test a physically unclonable function (PUF) based on relative threshold voltages of one or more pairs of transistors. In a particular embodiment, an electronic device is operable to generate a response to a challenge. The electronic device includes a plurality of transistors, with each of the plurality of transistors having a threshold voltage substantially equal to an intended threshold voltage. The electronic device includes a challenge input configured to receive the challenge. The challenge input includes one or more bits that are used to individually select each of a pair of transistors of the plurality of transistors. The electronic device also includes a comparator to receive an output voltage from each of the pair of transistors and to generate a response indicating which of the pair of transistors has the higher output voltage. The output voltage of each of the pair of transistors varies based on the threshold voltage of each of the pair of transistors.

18 Claims, 5 Drawing Sheets

PHYSICALLY UNCLONABLE FUNCTION IMPLEMENTED THROUGH THRESHOLD VOLTAGE COMPARISON

I. FIELD OF THE DISCLOSURE

The present disclosure relates generally to device authentication, and, more specifically, to determining how a device may respond to a challenge according to a physically unclonable function (PUF) so as to authenticate the device.

II. BACKGROUND

A physically unclonable function (PUF) exploits variations, such as statistical process variation in manufacture or operation, to generate secret keys used in cryptographic operations, chip authentication, and even random number generation. A device that supports a PUF yields different responses to different challenge inputs. Authentication of a device using a PUF is performed by supplying a challenge input to the device to which the response of an authentic device is known. The response is a result of a function that, by definition, is not clonable. For example, a PUF may result from process variations in the production of otherwise identical devices. As a result of the process variations, the otherwise identical devices may respond with a different series of bits in response to a set of challenge input bits. An expected response to each of one or more sets of challenge inputs is determined empirically for each of the devices by determining a response to each of the one or more sets of challenge bits. A particular device may authenticate itself by providing the expected response to the one or more sets of challenge bits recorded for that particular device. Common circuit choices to implement a PUF may include using a ring oscillator or a multiplexer arbiter scheme.

It is desirable that a PUF be both unpredictable and stable. If a PUF is predictable, a response to a challenge may be determined without querying the authentic device. Thus, a predictable PUF would enable authentication to be faked. If the PUF is unstable, the authentic device may not always generate the same response in reply to a challenge and, as a result, an authentic device may be unable to authenticate itself.

III. SUMMARY OF THE DISCLOSURE

In a particular embodiment, an electronic device having a physically unclonable function is disclosed. The electronic device is operable to generate a response to a challenge. The electronic device includes a plurality of transistors, with each of the plurality of transistors having a threshold voltage substantially equal to an intended threshold voltage. The electronic device includes a challenge input configured to receive the challenge. The challenge includes one or more bits that are used to individually select each of a pair of transistors of the plurality of transistors. The electronic device also includes a comparator to receive an output voltage signal from each of the pair of transistors and to generate a response indicating which transistor of the pair of transistors has the higher output voltage. The output voltage of each of the pair of transistors varies as a result of variation in the threshold voltage of each of the pair of transistors.

In another embodiment, a method of providing an electronic device with a physically unclonable function operable to generate a response to a challenge is disclosed. A plurality of transistors is provided, with each of the plurality of transistors having a threshold voltage substantially equal to an intended threshold voltage. A selector is provided, where the selector is configured to respond to a challenge including a combination of selection bits that individually selects an output voltage of each of a pair of transistors from the plurality of transistors. A differential amplifier is provided to receive the output voltage from each of the pair of transistors and to generate a response based on which of the pair of transistors has the higher threshold voltage. The output voltage of each of the pair of transistors varies as a result of a variation in the threshold voltage of each of the pair of transistors.

In another embodiment, a method of authenticating a device is disclosed. A challenge is provided to the device. In response to the challenge each of a pair of transistors is individually selected from among a plurality of transistors included in the device. Each of the plurality of transistors is configured to have a threshold voltage substantially equal to an intended threshold voltage. A response is generated based on which of the pair of transistors has a higher threshold voltage. The response is compared with an expected response. The device is verified as authentic in response to determining that the response matches the expected response.

A sequence of challenges may be received and, in response, a sequence of responses may be generated for purposes of authenticating a device. A screening device may offset a differential amplifier input voltage or "flip" the output bits to determine if one or more pairs of transistors fail to provide a stable response to a challenge that selects the one or more pairs of transistors. Using the screening device, pairs of transistors that do not provide a stable response may be screened from an authentication process so that only other pairs of transistors may be used for authenticating the device.

Features that characterize the invention are set forth in the claims annexed hereto and forming a further part hereof. However, for a better understanding of embodiments of the invention, and of the advantages and objectives attained through its use, reference should be made to the Drawings and to the accompanying descriptive matter.

IV. BRIEF DESCRIPTION OF THE DRAWINGS

Figure 4:
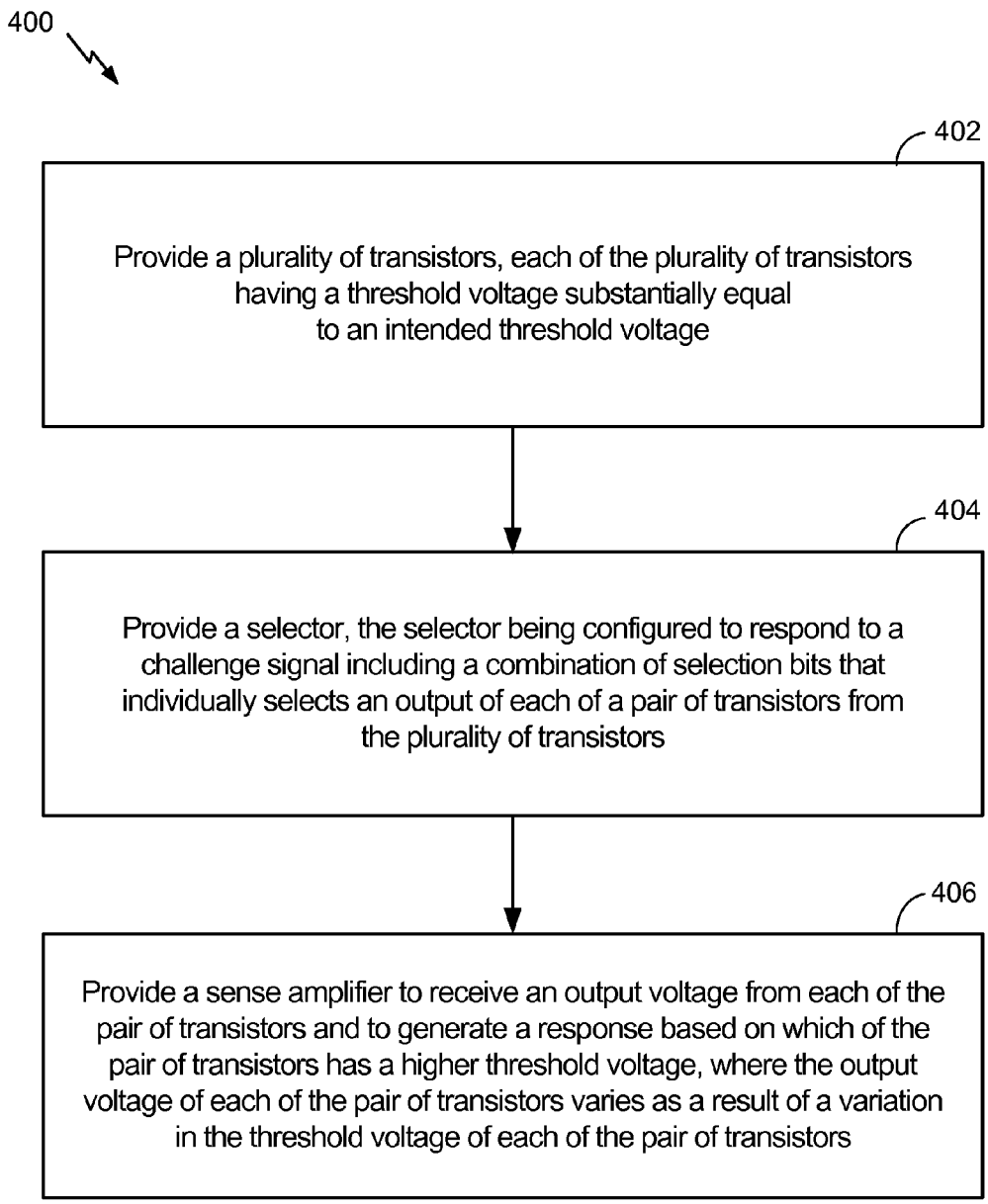
Figure 5:
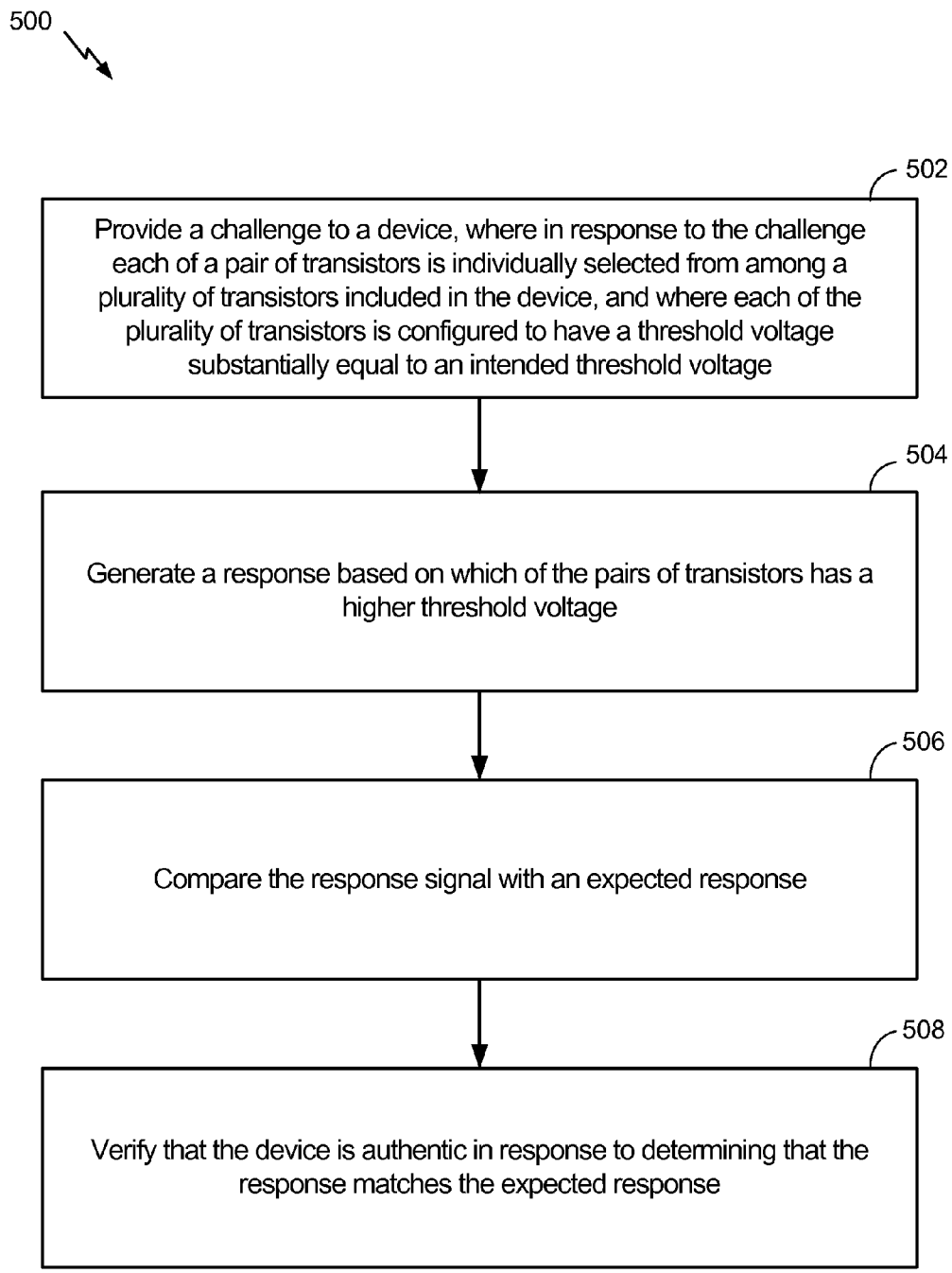

FIG. 4 is a flow diagram of a particular illustrative embodiment of a method of providing an electronic device with a PUF based on varying threshold voltages of one or more pairs of transistors; and FIG. 5 is a flow diagram of a particular illustrative embodiment of a method of authenticating a device by comparing a response generated in response to a challenge to an expected response where the response is based on varying threshold voltages of one or more pairs of transistors included in the device.

V. DETAILED DESCRIPTION

Figure 1:
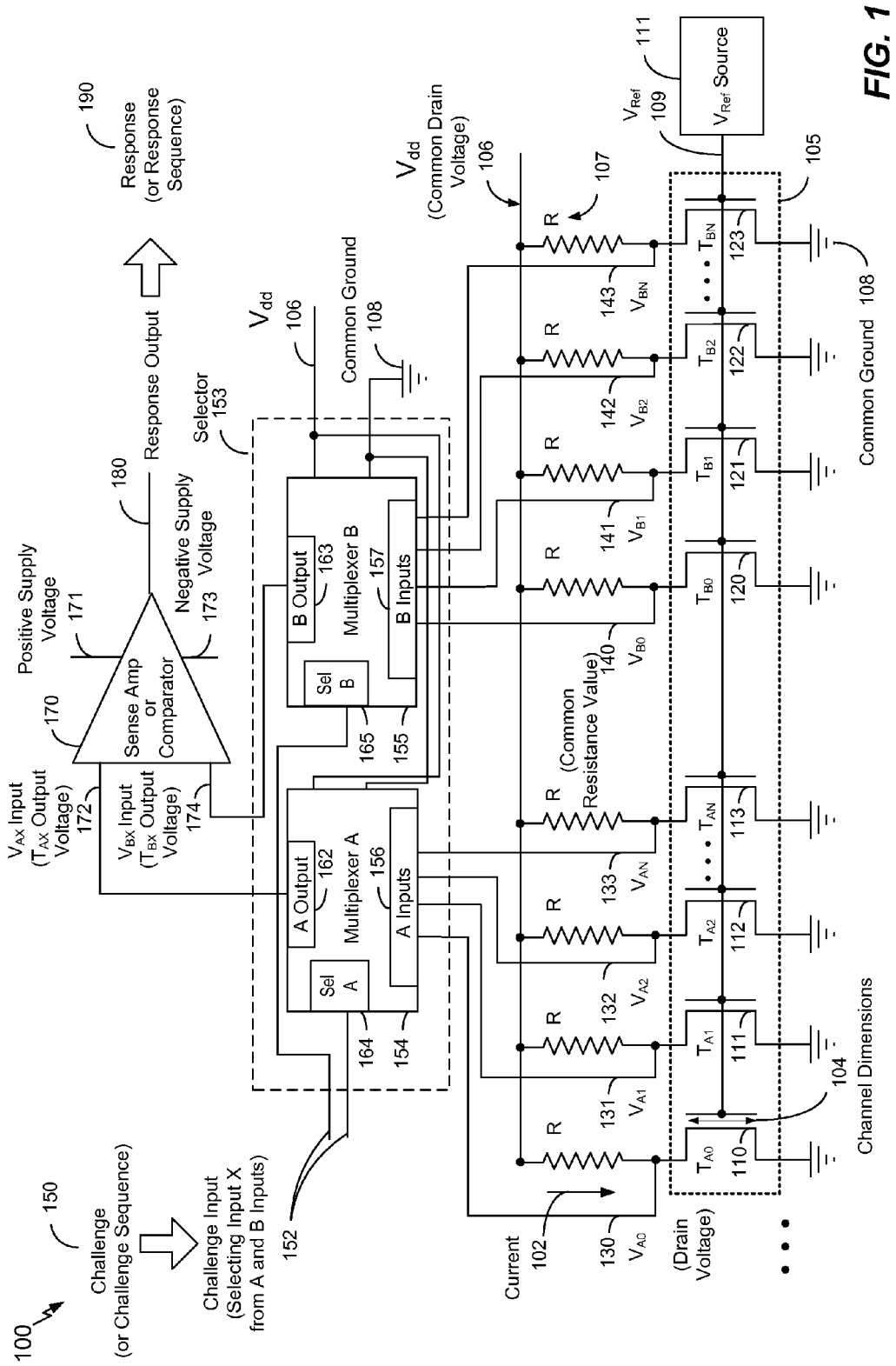
FIG. 1 is a block diagram of a particular illustrative embodiment of a device including a physically unclonable function (PUF) in the form of selectable transistor pairs configured to compare output voltages of each of a pair of selected transistors.

FIG. 1 is a block diagram of a particular illustrative embodiment of a device 100 including a physically unclonable function (PUF). The PUF is a result of a plurality of transistors 105 having varying threshold voltages as a result of process variations in their manufacture. The plurality of transistors 105 includes transistors $T_{A0}$ 110-$T_{AN}$ 113 and $T_{B0}$ 120-$T_{BN}$ 123. The transistors $T_{A0}$ 110-$T_{AN}$ 113 and $T_{B0}$-$T_{BN}$ 123 are configured to have substantially equal threshold voltages at an intended threshold voltage level to provide a basis for the PUF, as further explained below. In one particular illustrative embodiment, the threshold voltage is regarded as being substantially equal to the intended threshold voltage if the threshold voltage is within a range of plus or minus 50 mV of the intended threshold voltage. Also in one particular illustrative embodiment, the plurality of transistors 105 includes n-channel metal oxide semiconductor (NMOS) field effect transistors (FETs). Channel dimensions 104 of each of the plurality transistors 105, such as a channel width, channel length, channel depth, etc., are such that dopant variations that occur randomly in manufacture may result in a detectable variation in the threshold voltages of the transistors $T_{A0}$ 110-$T_{AN}$ 113 and $T_{B0}$ 120-$T_{BN}$ 123 in the device 100.

A drain of each of the transistors $T_{A0}$ 110-$T_{AN}$ 113 and $T_{B0}$ 120-$T_{BN}$ 123 included in the plurality of transistors 105 is connected to a common drain voltage $V_{dd}$ 106 through one of a plurality of resistors R 107. Each of the resistors R 107 is configured to have approximately a same resistance value as others of the resistors R 107. A source of each of the transistors $T_{A0}$ 110-$T_{AN}$ 113 and $T_{B0}$ 120-$T_{BN}$ 123 is connected to a common ground 108. Each of the transistors $T_{A0}$ 110-$T_{AN}$ 113 and $T_{B0}$ 120-$T_{BN}$ 123 is biased at a reference voltage Vref 109 by connecting a gate of each of the transistors $T_{A0}$ 110-$T_{AN}$ 113 and $T_{B0}$ 120-$T_{BN}$ 123 to Vref 109 generated by a reference voltage source 111. Vref 109 is set to be substantially equal to the intended threshold voltage of the plurality of transistors 105. Biasing the plurality of transistors 105 at a Vref 109 approximately equal to the intended threshold voltage results in variation of the output voltages of the plurality of transistors 105.

Output voltages $V_{A0}$ 130-$V_{AN}$ 133 of each of the transistors $T_{A0}$ 110-$T_{AN}$ 113 are measured between the associated resistor R 107 and a drain of each of the transistors $T_{A0}$ 110-$T_{AN}$ 113 and are connected to A inputs 156 of a selector 153. Output voltages $V_{B0}$ 140-$V_{BN}$ 143 of each of the transistors $T_{B0}$ 120-$T_{BN}$ 123 are measured between the resistor 107 and a drain of each of the transistors $T_{B0}$ 120-$T_{BN}$ 123 and are connected to B inputs 157 of the selector 153. The output voltages $V_{A0}$ 130-$V_{AN}$ 133 and $V_{B0}$ 140-$V_{BN}$ 143 are a function of a current 102 flowing through each resistor R 107.

The selector 153 is connected to Vdd 106 and the common ground 108 (or other voltage sources) to provide power for the selector 153. Where the selector 153 is comprised of a tandem of multiplexer A 154 and multiplexer B 155, both of the multiplexers 154 and 155 are connected to Vdd 106 and to the common ground 108 to provide power for the multiplexers 154 and 155. Output voltages $V_{A0}$ 130-$V_{AN}$ 133 of each of the transistors $T_{A0}$ 110-$T_{AN}$ 113 are connected to A inputs 156 of multiplexer A 154. Output voltages $V_{B0}$ 140-$V_{BN}$ 143 of each of the transistors $T_{B0}$ 120-$T_{BN}$ 123 are connected to B inputs 157 of multiplexer B 155. A challenge input 150 is connected to both a selection A input 164 of multiplexer A 154 and a selection B input 165 of multiplexer B 155. The selection A input 164 and the selection B input 165 may be connected together so that the challenge input 150 applied to both multiplexer A 154 and multiplexer B 155 results in corresponding transistors being selected from the transistors $T_{A0}$ 110-$T_{AN}$ 113 and from the transistors $T_{B0}$ 120-$T_{BN}$ 123. Alternatively, the selection A input 164 of multiplexer A 154 and the selection B input 165 of multiplexer B 155 may be separate so that the output voltages $V_{A0}$ 130-$V_{AN}$ 133 of any of the transistors $T_{A0}$ 110-$T_{AN}$ 113 may be selected independently from the selection of the output voltages $V_{B0}$ 140-$V_{BN}$ 143 of any of the transistors $T_{B0}$ 120-$T_{BN}$ 123. An A output 162 of multiplexer A 154 is connected to a $V_{AX}$ input 172 of the differential amplifier 170. A B output 163 of multiplexer B 155 is connected to a $V_{BX}$ input (or $T_{BX}$ output) 174 of the differential amplifier 170.

The differential amplifier 170 is connected to a positive supply voltage 171 and a negative supply voltage 173 (which may be the common drain voltage Vdd 106 and the common ground voltage 108 or other voltage sources) to provide power for the differential amplifier 170. An output of the differential amplifier 170 is a response output 180 which supplies a response or response sequence 190 to the challenge or challenge sequence 150.

The PUF is a result of the varying threshold voltage between the plurality of transistors 105 resulting in the output voltages $V_{A0}$ 130-$V_{AN}$ 133 and $V_{B0}$ 140-$V_{BN}$ 143 varying even though the inputs to each of the plurality of transistors 105, including Vdd 106, ground 108, and the bias voltage Vref 109, were the same. Process variations, such as random dopant variation in the manufacture of each the plurality of transistors 105, results in variation of the output voltages $V_{A0}$ 130-$V_{AN}$ 133 and $V_{B0}$ 140-$V_{BN}$ 143. Because each of the plurality of transistors 105 is connected to a common drain voltage Vdd 106, a common ground 108, and biased at a same reference voltage Vref 109, the output voltages $V_{A0}$ 130-$V_{AN}$ 133 and $V_{B0}$ 140-$V_{BN}$ 143 vary based on variations in the threshold voltage of each of the plurality of transistors 105. Thus, for example, when the challenge 150 causes the output voltages $V_{A0}$ 130 and $V_{B0}$ 140 to be selected and presented to the differential amplifier 170, a difference in the threshold voltages of the transistors $T_{A0}$ 110 and $T_{B0}$ 120, respectively, caused by process variations may result in a difference between $V_{A0}$ 130 and $V_{B0}$ 140. When $V_{A0}$ 130 is of a measurably higher voltage than $V_{B0}$ 140, the differential amplifier 170 generates, for example, a high value, that may be at or close to a level of the positive supply voltage 171 when $V_{A0}$ 130 is greater than $V_{B0}$ 140. Conversely, the differential amplifier generates a response output of a low value that may be close to a level of the negative supply voltage 173, when the voltage level of $V_{A0}$ 130 is measurably less than a voltage level of $V_{B0}$ 140.

A sequence of different pairs of transistors from among the plurality of transistors 105 may be selected by applying a challenge sequence 150 to the challenge input 152 to sequentially compare the output voltages $V_{A0}$ 130-$V_{AN}$ 133 of transistors $T_{A0}$ 110-$T_{AN}$ 113 with the output voltages $V_{B0}$ 140-$V_{BN}$ 143 of corresponding transistors $T_{B0}$ 120-$T_{BN}$ 123. Thus, the challenge 150 may include a challenge sequence that results in a response sequence 190. Because the threshold voltages of each of the plurality of the transistors 105 may vary between devices, the response or response sequence 190 generated in reply to application of a same challenge or challenge sequence 150 may vary between different devices. As a result, the response or response sequence 190 generated in response to the challenge or challenge sequence 150 may be used to authenticate a particular, individual device.

The threshold voltage varying among the plurality of transistors 105 is a random result of process variation and, thus, does not represent a generally clonable function; thus, the response or response sequence 190 that may randomly vary between different devices in response to a same challenge or challenge sequence 150 may be used as a PUF to uniquely identify a particular device, such as the device 100. Because the response or response sequence 190 to the challenge or challenge sequence 150 may randomly vary, the resulting response or response sequence 190 is not predictable or would be difficult to predict.

Because the response or response sequence 190 for a particular challenge or challenge sequence 150 for the device 100 is a result of process variations in creating the device 100, an expected response or response sequence 190 is empirically determined for each individual device. An expected response is determined by recording a response or response sequence 190 to a selected challenge or challenge sequence 190. The empirically-measured response or response sequence 190 may be used as an expected response to the challenge or challenge sequence 150 used to determine the expected response to determine whether a particular device is an authentic device.

Several points should be noted about the device 100 of FIG. 1. First, the longer the challenge sequence 150, the longer the response sequence 190, resulting in more possible challenge/response combinations being available to differentiate between devices. For example, if a challenge only tests one pair of transistors, a device may have a fifty percent chance of yielding the expected response to the challenge. However, for a challenge sequence 150 that queries the output voltages generated by N pairs of transistors, the response sequence 190 may have up to $2^N$ different combinations in response to the challenge sequence 150. In FIG. 1, there are four pairs of transistors, $T_{A0}$ 110-$T_{AN}$ 113 and $T_{B0}$ 120-$T_{BN}$ 123, thus, a challenge sequence 150 that selects each of the pairs of transistors $T_{A0}$ 110-$T_{AN}$ 113 and $T_{B0}$ 120-$T_{BN}$ 123 once has up to $2^4$ or 16 different possible response sequences 190. Providing additional pairs of transistors, for example, if the challenge sequence 150 sequentially selects and queries a response to a sequence of fifteen transistor pairs, the response to the challenge may have $2^{15}$ or 32,768 different responses to differentiate between different devices. It will be appreciated that selecting one of the A transistors $T_{A0}$ 110-$T_{AN}$ 113 separately from one of the B transistors $T_{B0}$ 120-$T_{BN}$ 123, results in a greater number of combinations than if corresponding transistors, such as $T_{A0}$ 110 and $T_{B0}$ 120, are selected by providing a same set of challenge bits to the selection A input 164 and the selection B input 165.

Second, the challenge sequence 150 may be applied in a non-linear fashion. Although the challenge 150 is termed a sequence, the sequence may be other than an arithmetic sequence. Maintaining secrecy of the challenge sequence 150, e.g., in what order or how many times a pair of transistors is selected, may add another level of security in authenticating a particular device. For example, querying each of the four pairs of transistors, $T_{A0}$ 110-$T_{AN}$ 113 and $T_{B0}$ 120-$T_{BN}$ 123 of FIG. 1 once results in $2^4$ or 16 different possible response sequences 190, but if a four-step challenge (i.e., selection of four pairs of transistors $T_{A0}$ 110-$T_{AN}$ 113 and $T_{B0}$ 120-$T_{BN}$ 123 in some order), the sequence may have $2^4$ or 16 different possible response sequences. Thus, combining the number of possible challenge sequences 150 and the number of possible responses yields $16^2$ or 256 different combinations. In any case, the term challenge sequence 150 is not limited to an arithmetic or progressive sequence of the transistors.

Third, process variations in producing the device 100 may affect the output voltages $V_{A0}$ 130-$V_{AN}$ 133 and $V_{B0}$ 140-$V_{BN}$ 143 of the transistors $T_{A0}$ 110-$T_{AN}$ 113 and $T_{B0}$ 120-$T_{BN}$ 123, respectively, and may result in a reading bias of the differential amplifier 170. For example, a process variation may result in an inherent offset in the differential amplifier 170 such that a first voltage applied to the $V_{AX}$ input 172 is read by the differential amplifier 170 as presenting a higher voltage than a second voltage applied to the $V_{BX}$ input 174 even when the first and second voltage are identical. Thus, the expected response for the device 100 is determined using the differential amplifier 170 so as to inherently take into account for a process variation bias in the differential amplifier as well as process variations in the plurality of transistors 105.

Fourth, it is possible that, because of process variations in forming the plurality of transistors 105 or in forming the differential amplifier 170, the response 190 yielded for any particular pair of transistors from among the plurality of transistors 105 may have an unstable response. Specifically, the threshold voltages for the selected pair of transistors may be so close, e.g., within 100 to 500 microvolts or some similar range, that the output voltages are highly similar, and the differential amplifier 170 may not be able to determine (or not be able to consistently determine) which transistor of the pair of transistors has a higher output. The differential amplifier 170 may have an offset that, in combination with the difference in threshold voltages between a selected pair of transistors, the differential amplifier 170 may fail to consistently (and wrongly) determine that one of the pair of transistors has a higher output voltage when that transistor actually has a lower output voltage than the other of transistors in a pair.

Correspondingly, the differential amplifier 170 and the plurality of transistors 105 may respond differently at different operating temperatures or at different supply voltages. Thus, for example, at a first operating temperature, the differential amplifier 170 may determine a first of a pair of transistors has a higher output voltage. However, after the differential amplifier 170 and the pair of transistors reach a second operating temperature, the output voltages of the pair of transistors may shift slightly or the differential amplifier 170 may compare input voltages slightly differently. As a result, after reaching the second operating temperature, the differential amplifier 170 may determine that a second of the pair of transistors has a higher output voltage. Thus, it may be desirable to identify transistor pairs that lead to an unstable response and mask them from use in a challenge/response sequence. As described below with reference to FIGS. 2-3, embodiments of the present disclosure may include mechanisms to identify transistor pairs that may result in an unstable response as read by the differential amplifier 170.

Figure 2:
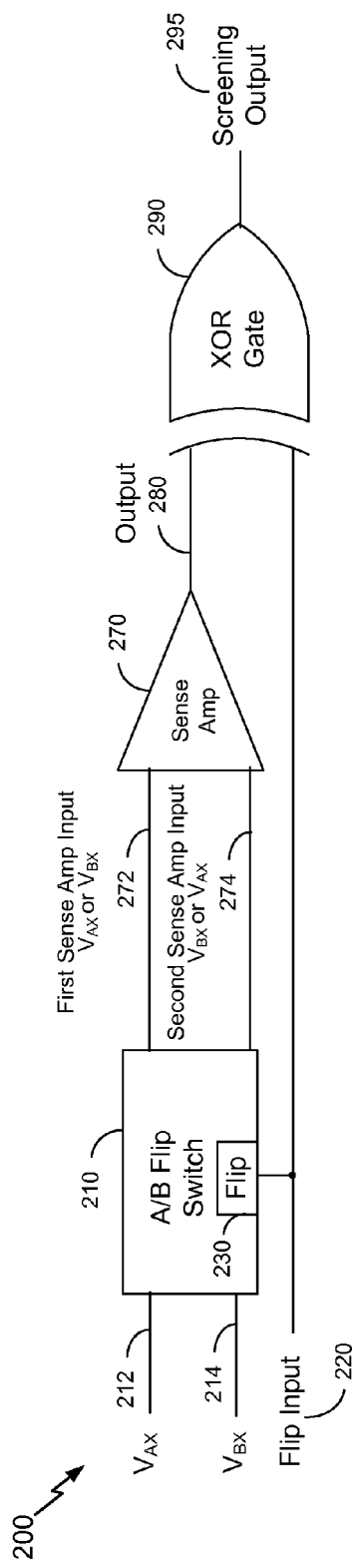
FIG. 2 is a block diagram of a particular embodiment of a screening device that may be used to determine a stability of a response to a challenge by flipping the output voltages of the pair of transistors of the device of FIG. 1 as the output voltages are input to a differential amplifier.

A sequence of challenges may be applied to the challenge input 150 to select different pairs of transistors from among the plurality of transistors 105. The number of bits in each challenge is a function of the number of transistors in each of the groups of transistors $T_{A0}$ 110-$T_{AN}$ 113 and $T_{B0}$ 120-$T_{BN}$ 123 to be selected by each of the multiplexers 154 and 155. Using the multiplexers 154 and 155, the number of bits in each challenge is 2×log 2 N, where N is one-half of the number transistors (i.e., 4 bits for the 8-transistor case of FIG. 1, 6 bits for a 16-transistor case, etc.). For example, with four transistors in each of the groups $T_{A0}$ 110-$T_{AN}$ 113 and $T_{B0}$ 120-$T_{BN}$ 123 as shown in FIG. 1, a pair of two-bit inputs enables selection of one of the four transistors in each of the groups. A sequence of two-bit input pairs may enable selection of each of the pairs of transistors to apply a challenge to the device 100. With additional pairs of transistors added to the plurality of transistors 105, a larger selection input is used to select pairs of transistors. A sequence of challenges elicits a sequence of responses. The number of transistors used to implement the PUF and the number of pairs selected in authenticating the device 100 may be selected to provide as many possible combinations as desired to increase a number of possible responses to a challenge, for example, to reduce the possibility of false authentication of a device FIG. 2 is a block diagram of a particular embodiment of a screening device 200 that may be used to determine a stability of a response of a selected pair of transistors to a challenge. As previously mentioned with reference to FIG. 1, because of process variations in forming the plurality of transistors 105 or in forming the differential amplifier 170, the response 190 yielded for any particular pair of transistors from among the plurality of transistors 105 may have a stable or an unstable response. A response of a pair of transistors is considered stable where an output voltage of a first transistor is consistently higher than that of a second transistor by a sufficiently wide margin so that an associated differential amplifier consistently recognizes the output voltage of the first transistor as greater than that of the second transistor. By contrast, for example, if the margin between the output voltages is too small, transient conditions may cause the differential amplifier to yield inconsistent results upon comparing the output voltages of the transistors. If the differential amplifier's comparison of the output voltages for a pair of transistors in a given device does not yield a consistent result, then the output voltages for the pair of transistors should not be used in the PUF used to authenticate a device. Thus, it may be desirable to identify transistor pairs that lead to an unstable response and mask them from use in a challenge/response sequence that may be used in authenticating the device. The device 200 provides one way to identify transistors whose output voltages may represent an unstable response and thus should not be used in a PUF challenge and response.

In general, the device 200 "flips" the signals to a differential amplifier 270 (or another comparator) to determine if the output voltages of a selected pair of transistors yields a stable response. The device 200 includes an A/B flip switch 210 that receives an output voltage of a first selected transistor $V_{AX}$ as a first input 212 and an output voltage of a second of the selected pair of transistors $V_{BX}$ as a second input 214. Outputs of the A/B flip switch 210 are connected to a first differential amplifier input 272 and a second differential amplifier input 274. The first differential amplifier input 272 and the second differential amplifier input 274 may present either $V_{AX}$ and $V_{BX}$ or $V_{BX}$ and $V_{AX}$, respectively. The flipping of the input values is controlled by a flip control 230. The flip control 230 may receive a single bit flip input 220 that, for example, causes the A/B flip switch 210 to present $V_{AX}$ and $V_{BX}$ at the differential amplifier inputs 272 and 274 when the flip input 220 is a logical low value, and to present $V_{BX}$ and $V_{AX}$, at the differential amplifier inputs 272 and 274, respectively, when the flip bit input 220 is a logical high value.

For example, the A/B flip switch 210 may be implemented using transistors (not shown in FIG. 2) as switches between inputs 212 and 214 of the A/B flip switch 210 and the differential amplifier inputs 272 and 274. The transistors may be configured such that, when the flip input 220 includes a logical low value, gates of a first set of transistors are energized to connect the first input 212 to the first differential amplifier input 272 and to connect the second input 214 to the second differential amplifier input 274. When the flip bit input 220 includes a logical high value, the gates of the first set of transistors are de-energized while gates of a second set of transistors are energized to connect the first input 212 to the second differential amplifier input 274 and to connect the second input 214 to the first differential amplifier input 272 to flip the inputs 272 and 274 of the differential amplifier 270.

The inputs 272 and 274 are compared by the differential amplifier 270 in a similar process as the $V_{AX}$ input 172 and the $V_{BX}$ input 174 are compared by the differential amplifier 170 in FIG. 1. For example, the differential amplifier 270 may generate a logical high value at a differential amplifier output 280 when a voltage at the first differential amplifier input 272 of the A/B flip switch 210 is greater than the voltage at the second differential amplifier input 274. The differential amplifier 270 may generate a logical low value at the differential amplifier output 280 when a voltage at the first differential amplifier input 272 is less than the voltage at the second differential amplifier input 274. The output 280 of the differential amplifier 270 and the flip input 220 are received by an exclusive OR (XOR) gate 290. As further explained below, the output voltages of the transistors $V_{AX}$ and $V_{BX}$ may be regarded as stable when a screening output 295 remains the same when the flip input 220 is switched from low to high or from high to low. The output voltages of the transistors $V_{AX}$ and $V_{BX}$ may be regarded as unstable when the screening output 295 switches to present a different value when the flip input 220 is switched from low to high or from high to low.

For example, consider a case in which the output voltage of a first transistor $V_{AX}$ (such as transistor $T_{A0}$ 110 of FIG. 1) is greater than the output voltage of a second transistor $V_{BX}$ (such as transistor $T_{B0}$ 130 of FIG. 1). When the inputs 212 and 214 are not flipped, the voltage at the first differential amplifier input 272 is determined by the differential amplifier 270 to be greater than the voltage at the second differential amplifier input 274. Thus, the differential amplifier output 280 is a logical high value and the flip input 220 is a logical low value. The screening output 295 is a logical high value because an XOR of the logical high value of the differential amplifier output 280 and the logical low value of the flip input 220 is a logical high value. When the flip input 220 is changed to a logical high value, the inputs 212 and 214 are flipped so that $V_{BX}$ is presented at the first differential amplifier input 272 and $V_{AX}$ is presented at the second differential amplifier input 274. Because $V_{BX}$ is less than $V_{AX}$, the differential amplifier output 280 is a logical low value. The XOR of the logical low value of the differential amplifier output 280 and the logical high value of the flip input 220 again results in a logical high value at the screening output 295. Because the screening output 295 remains the same for both values of the flip input 220, the margin between the output voltages $V_{AX}$ and $V_{BX}$ of the selected transistors is sufficiently large to overcome any bias or offset in the differential amplifier 270 and thus may be regarded as stable.

Conversely, consider a case in which the output voltage $V_{AX}$ of first transistor is greater than the output voltage $V_{BX}$ of a second transistor, but only by a very small margin such that, under some conditions, the margin between $V_{AX}$ and $V_{BX}$ may be too small to discern (e.g., within 100 to 500 microvolts, depending on the sensitivity of the differential amplifier 270), or $V_{AX}$ may be read as less than $V_{BX}$ by an imperfect differential amplifier or other comparator. When the inputs 212 and 214 are not flipped, the voltage at the first differential amplifier input 272 may be determined by the differential amplifier 270 to be greater than the voltage at the second differential amplifier input 274. Thus, the differential amplifier output 280 is a logical high value and the flip input 220 is a logical low value. The screening output 295 is a logical high value because an XOR of the logical high value of the differential amplifier output 280 and the logical low value of the flip input 220 is a logical high value. When the flip input 220 is changed to a logical high value, the inputs 212 and 214 are flipped so that $V_{BX}$ is presented at the first differential amplifier input 272 and $V_{AX}$ is presented at the second differential amplifier input 274. However, because of the small margin between $V_{BX}$ and $V_{AX}$, the differential amplifier 270 may read $V_{BX}$ as greater than $V_{AX}$; thus the output 280 again is a logical high value. The XOR of the logical high value of the differential amplifier output 280 and the logical high value of the flip input 220 again results in a logical low value at the screening output 295. The change in the screening output 295 indicates that the differential amplifier 270 failed to consistently and correctly differentiate the output voltages $V_{AX}$ and $V_{BX}$. In this case, the transistor pair producing $V_{AX}$ and $V_{BX}$ should not be used in the PUF because their output voltages are not sufficiently stable as determined by the differential amplifier 270.

Figure 3:
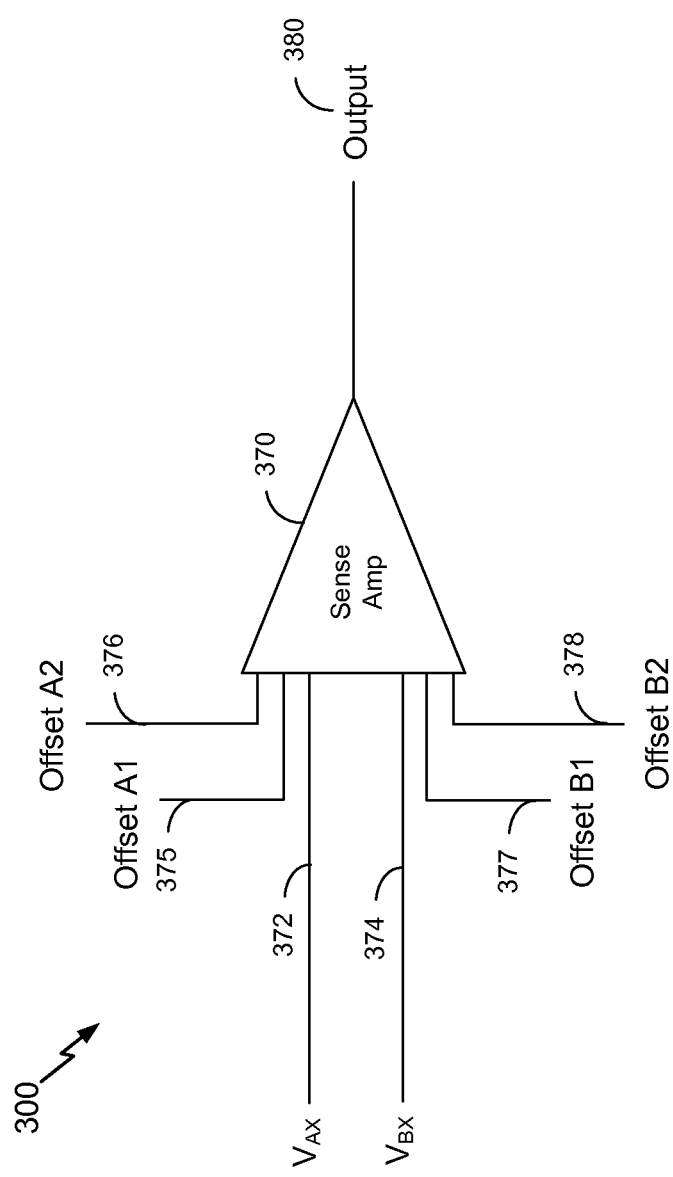
FIG. 3 is a block diagram of another particular embodiment of a screening device that may be used to determine a stability of a response to a challenge by selectively applying offsets to the output voltages applied to the differential amplifier by one or more of the pairs of transistors of the device of FIG. 1.

FIG. 3 is a block diagram of another particular embodiment of a screening device 300 that may be used to determine a stability of a response to a challenge. As previously described with reference to FIG. 3, flipping the output voltages $V_{AX}$ and $V_{BX}$ of a transistor pair may indicate whether the margin between $V_{AX}$ and $V_{BX}$ is too small for the differential amplifier 370 to consistently read one of the output voltages $V_{AX}$ and $V_{BX}$ as higher than the other. Another way to test the margin between the output voltages producing $V_{AX}$ and $V_{BX}$ is to apply offsets to the inputs of a differential amplifier 370 to determine whether a differential amplifier output 380 changes in response to the application of the offsets. Changes in the differential amplifier output 380 as a result of small offsets applied to the inputs of the differential amplifier 370 may indicate that a margin between the output voltages $V_{AX}$ and $V_{BX}$ is too small for the differential amplifier 370 to differentiate stably and consistently.

For example, the differential amplifier 370 may generate a logical high value at a differential amplifier output 380 when an output voltage $V_{AX}$ of a first of a pair of transistors applied at a first input 372 is greater than an output voltage $V_{BX}$ of a second of the pair of transistors applied at a second input 374. Conversely, the differential amplifier 370 may generate a logical low value at the differential amplifier output 380 when the output voltage $V_{AX}$ of the first of the pair of transistors applied at the first input 372 is less than the output voltage $V_{BX}$ of the second of the pair of transistors applied at the second input 374. The differential amplifier 370 also may include a plurality of offset inputs 375-378. Each of the offset inputs 375-378 may be used to augment a voltage applied at one of the inputs 372 and 374 to determine whether the output voltages $V_{AX}$ and $V_{BX}$ of the selected pair of transistors is stable as read by the differential amplifier 370. One or more offset inputs, such as offset input A1 375 and offset input A2 376, may be used to augment the output voltage at the first input 372 when the output voltage at the first input 372 is determined to be the lesser output voltage. One or more corresponding offset inputs, such as offset input B1 377 and offset input B2 378, may be used to augment the output voltage at the second input 374 when the output voltage at the second input 374 is determined to be the lesser output voltage.

The offset inputs 375-378 may include voltage inputs each configured to receive a known offset voltage that is added directly to the respective input voltage. For example, each of the offset input A1 375 and the offset input A2 377 may be configured to receive a known fraction of a volt to offset the output voltage applied to the first input 372. Alternatively, the differential amplifier 370 may include internal voltage sources to selectively augment a voltage applied at one of the inputs 372 and 374 such that the offset inputs 375-378 each receive a voltage representing a logical value to energize a transistor or otherwise activate an offset within the differential amplifier 370 to augment the corresponding input by a known offset voltage. The offset inputs 375-378 may each cause the same quantity of voltage to be added to a corresponding input 372 or 374. Alternatively, the offset inputs 375-378 may cause different quantities of voltage to be added to each of the input voltages.

For example, consider a case in which the output voltage of a first transistor $V_{AX}$ is greater than the output voltage of a second transistor $V_{BX}$ by a significant margin. When the output voltages $V_{AX}$ and $V_{BX}$ are applied to the first input 372 and to the second input, respectively, the differential amplifier output 380 is a logical high value. Because one of the output voltages ($V_{AX}$ at the first input 372) was determined to be larger than another of the output voltages ($V_{BX}$ at the second input 374), the lower output voltage ($V_{BX}$) may be augmented to determine if a slight change in the output voltages being compared changes the differential amplifier output 380, indicating that the output voltages $V_{AX}$ and $V_{BX}$ for the selected pair of transistors may be unstable. To augment the output voltage determined to be lower ($V_{BX}$), a first offset to the lower output voltage offset B1 377 is activated. If the differential amplifier output 380 does not change, the pair of transistors producing the output voltages $V_{AX}$ and $V_{BX}$ may be identified or regarded as stable. Alternatively, the pair of transistors producing the output voltages $V_{AX}$ and $V_{BX}$ may only be regarded as stable once the first offset input offset B1 377 and the second offset input B2 378 has also been applied with no change to the differential amplifier output 380. On the other hand, if application of offset B1 377 or a combination of offset B1 377 and offset B2 378 result in a change in the differential amplifier output 380, the output voltages $V_{AX}$ and $V_{BX}$ of the selected pair of transistors may be identified as unstable and, thus, not used in a PUF. It should be noted that, if the output voltage $V_{BX}$ applied at the second input 374 were determined to be the higher voltage, the voltage offsets offset A1 375 and offset A2 376 would be used to augment the output voltage $V_{AX}$ applied at the first input 372 to determine if the output voltages $V_{AX}$ and $V_{BX}$ indicated that the selected pair of transistors producing the output voltages $V_{AX}$ and $V_{BX}$ were sufficiently stable to be included in a PUF.

FIG. 4 is a flow diagram of a particular illustrative embodiment of a method 400 of providing an electronic device with a PUF implemented by comparing threshold voltages of one or more pairs of transistors to determine a response to a challenge. The method includes providing a plurality of transistors, each of the plurality of transistors being configured to have a threshold voltage substantially equal to an intended threshold voltage, at 402, such as the plurality of transistors 105 provided in the device 100 of FIG. 1. A selector is provided that is configured to respond to a challenge including a combination of selection bits to individually select an output of each of a pair of transistors from the plurality of transistors, at 404. For example, the multiplexers 154 and 155 of FIG. 1 (operating in tandem as the selector 153) each select one transistor from each corresponding group of transistors, such as the groups of transistors $T_{A0}$ 110-$T_{AN}$ 113 and $T_{A0}$ 110-$T_{AN}$ 113 of FIG. 1, based on a challenge input 150 that is applied to selection inputs of both multiplexer A 154 and multiplexer B 155.

A differential amplifier is provided to receive an output voltage from each of the pair of transistors and to generate a response indicating which of the pair of the plurality of transistors has a higher output voltage, at 406. The output voltage of each of the pair of transistors varies as a result of a variation in the threshold voltage of each of the transistors. For example, the differential amplifier may include the differential amplifier 170 of FIG. 1 where the differential amplifier output 280 provides a bit output that indicates which of output voltages $V_{AX}$ and $V_{BX}$ of the selected pair of transistors is the higher output voltage. It should be noted that the transistor of the selected pair of transistors with the higher output voltage may be the transistor with the lower threshold voltage. Of two transistors connected to a common drain voltage 106, a common ground 108, and biased at a common reference voltage Vref, as in FIG. 1, the transistor with the higher threshold voltage generates less current and a smaller voltage drop across the resistor, therefore resulting in the higher output voltage. In any case, providing a workable PUF relies on determining an expected, stable response to a known challenge, where the PUF is sufficiently random that it cannot be readily predicted or reverse-engineered.

FIG. 5 is a flow diagram of a particular illustrative embodiment of a method 500 of authenticating a device by comparing a response generated in response to a challenge to an expected response. The response is based on threshold voltages of one or more pairs of transistors included in the device which, in the foregoing examples, is determined by measuring an output voltage of the one or more transistors as being indicative of the threshold voltages of the one or more transistors.

The method 500 includes providing a challenge to a device, where in response to the challenge each of a pair of transistors is individually selected from among a plurality of transistors included in the device, at 502. Each of the plurality of transistors is configured to have a threshold voltage substantially equal to an intended threshold voltage, as in the plurality of transistors 105 of FIG. 1. A response is generated based on which of the pair of transistors has a higher output voltage, at 504. The output voltage of each of the pair of transistors varies based on the threshold voltage of each of the pair of transistors. For example, a signal indicating which of the pair of transistors has a lower output voltage (when connected to a common drain voltage, ground, and bias voltage, as the plurality of transistors 105 are in FIG. 1) may indicate which of the pair of transistors has a higher threshold voltage. However, as previously described, what is significant is the relative variation in the threshold voltage between the transistors rather than whether a particular transistor has a higher or a lower threshold voltage than another.

The response determined, at 504, is compared with an expected response, at 506. The PUF implemented by variation of threshold voltages is based on the empirically-determined output voltages of the transistors to identify an expected response to a known challenge. The device may be verified as authentic (or not) in response to determining that the response matches the expected response, at 508. Because the expected response is known for a particular challenge, a device can be authenticated based on whether the device generates the expected response in reply to the known challenge.

Particular embodiments can take the form of an entirely hardware embodiment, an entirely software embodiment, or an embodiment containing both hardware and software elements. Further, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, or communicate the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Examples of optical disks include compact disc-read only memory (CD-ROM), compact disc-read/write (CD-R/W) and DVD. A data processing system suitable for storing and/or executing program code includes at least one processor connected directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

While the present invention has been illustrated by a description of various embodiments and while these embodiments have been described in considerable detail, it is not the intention of the Applicants to restrict, or any way limit the scope of the appended claims to such detail. The invention in its broader aspects is therefore not limited to the specific details, representative apparatus, methods, and illustrative examples shown and described. Accordingly, departures may be made from such details without departing from the scope of Applicants' general inventive concept.

The invention claimed is:

1. An electronic device having selectable transistor pairs configured to generate a response to a challenge, the electronic device comprising:
   a plurality of transistors, each of the plurality of transistors having a threshold voltage substantially equal to an intended threshold voltage;
   a challenge input configured to receive the challenge, wherein the challenge input includes one or more bits that are used to individually select a first transistor of the plurality of transistors and a second transistor of the plurality of transistors;
   a comparator configured to:
   receive a first output voltage from the first transistor;
   receive a second output voltage from the second transistor;
   receive an offset voltage;
   generate a first response indicating which of the first transistor and the second transistor has a higher output voltage based on a comparison of the first output voltage and the second output voltage, wherein the first output voltage and the second output voltage vary as a result of a variation in the threshold voltages of the first transistor and the second transistor; and
   generate a second response, wherein the second response differs from the first response when a sum of the offset voltage and a lower voltage of the first output voltage and the second output voltage is greater than or equal to a higher voltage of the first output voltage and the second output voltage and wherein the second response is the same as the first response when the sum is less than the higher voltage;
   a reference voltage source configured to:
      supply a reference voltage that is substantially equal to the intended threshold voltage to a first gate of the first transistor, and
      supply the reference voltage to a second gate of the second transistor;
   wherein the first output voltage results from a current flowing from a common drain voltage source across a first resistor having a common resistance value when the reference voltage is applied to the first gate; and
   wherein the second output voltage results from the current flowing from the common drain voltage source across a second resistor having the common resistance value when the reference voltage is applied to the second gate.

2. The electronic device of claim 1, wherein the threshold voltage of the first transistor and the second transistor varies as a result of dopant variation in manufacture of the first transistor and the second transistor, respectively.

3. The electronic device of claim 1, further comprising a selector to select the first transistor and the second transistor in response to receiving the challenge at the challenge input.

4. The electronic device of claim 3, wherein the selector includes a pair of multiplexers, wherein the challenge input is coupled to a selection input of each of the pair of multiplexers, and wherein in response to receiving the challenge, each of the pair of multiplexers selects a different transistor of the plurality of transistors.

5. The electronic device of claim 1, wherein the comparator is a differential amplifier.

6. The electronic device of claim 5, further comprising:
an exclusive-or (XOR) gate configured to:
receive the first response from the differential amplifier; and
receive a flip bit signal from a flip input; and
a flip switch configured to:
direct the first output voltage to a first input of the differential amplifier and direct the second output voltage to a second input of the differential amplifier in response to the flip bit signal having a first value; and
direct the second output voltage to the first input of the differential amplifier and direct the first output voltage to the second input of the differential amplifier in response to the flip bit signal having a second value,
wherein a change in an output of the XOR gate in response to the flip bit signal changing from the first value to the second value indicates that the first response may be unstable.

7. The electronic device of claim 1, wherein the threshold voltage of each of the plurality of transistors is within 50 millivolts of the intended threshold voltage.

8. The electronic device of claim 1, wherein the first transistor is selected from a first subset of the plurality of transistors and the second transistor is selected from a second subset of the plurality of transistors, wherein the first subset is distinct from the second subset.

9. A method of providing an electronic device with selectable transistor pairs configured to generate a response to a challenge, the method comprising:
supplying a reference voltage substantially equal to an intended threshold voltage to gates of a plurality of transistors, each of the plurality of transistors having a threshold voltage substantially equal to the intended threshold voltage;
selecting, at a selector, a first transistor and a second transistor of the plurality of transistors in response to a challenge including a combination of selection bits;
receiving, at a differential amplifier, a first output voltage of the first transistor, a second output voltage of the second transistor, and an offset voltage;
generating, at the differential amplifier, a first response to the challenge in response to determining which of the first transistor and the second transistor has a higher output voltage based on a comparison of the first output voltage and the second output voltage, wherein the first output voltage and the second output voltage are positive and wherein the first output voltage and the second output voltage vary as a result of a variation in threshold voltages of the first transistor and the second transistor;
generating, at the differential amplifier, a second response to the challenge, wherein the second response differs from the response when a sum of the offset voltage and a lower voltage of the first output voltage and the second output voltage is greater than or equal to a higher voltage of the first output voltage and the second output voltage and wherein the second response is the same as the first response when the sum is less than the higher voltage;
wherein a drain of the first transistor is connected to a common drain voltage via a first resistor having a common resistance value, wherein the first output voltage includes a voltage across the first resistor when the reference voltage is applied to a gate of the first transistor; and
wherein a drain of the second transistor is connected to the common drain voltage via a second resistor having the common resistance value, wherein the second output voltage includes a voltage across the second resistor when the reference voltage is applied to a gate of the second transistor.

10. The method of claim 9, further comprising wherein each of the plurality of transistors has channel dimensions susceptible to causing a change in the threshold voltage in response to a dopant variation in manufacture.

11. The method of claim 9, wherein the selector includes a pair of multiplexers, wherein the challenge is a selection input of each of the multiplexers, and wherein in response to receiving the challenge, each of the multiplexers selects a different transistor of the plurality of transistors.

12. The method of claim 9, further comprising identifying, at a screening device, the first transistor and the second transistor in response to determining that the response is unstable.

13. The method of claim 12, wherein the screening device includes one or more offset inputs to the differential amplifier, wherein the one or more offset inputs are configured to receive an offset signal to offset the first output voltage, and wherein a change in the response caused by receiving the offset signal indicates that a difference between the first output voltage and the second output voltage is less than or equal to a voltage of the offset signal and that the response is unstable.

14. The method of claim 12, wherein the screening device includes:
an exclusive-or (XOR) gate configured to:
receive the response from the differential amplifier; and
receive a flip bit signal from a flip input; and
a flip switch configured to:
direct the first output voltage to a first input of the differential amplifier and direct the second output voltage to a second input of the differential amplifier in response to the flip bit signal having a first value; and
direct the second output voltage to the first input of the differential amplifier and direct the first output voltage to the second input of the differential amplifier in response to the flip bit signal having a second value,
wherein a change in an output of the XOR gate in response to the flip bit signal changing from the first value to the second value indicates that the response is unstable.

15. A method comprising:
sending a challenge to a device, wherein in response to the challenge a first transistor and a second transistor are selected from a plurality of transistors included in the device and wherein each of the plurality of transistors is configured to have a threshold voltage substantially equal to an intended threshold voltage;
receiving a first response indicating which of a first output voltage of the first transistor and a second output voltage of the second transistor is higher based on a comparison of the first output voltage and the second output voltage, wherein the first output voltage and the second output voltage are positive;
receiving a second response, wherein the second response differs from the first response when a first sum of a first offset voltage and a lower voltage of the first output voltage and the second output voltage is greater than or equal to a higher voltage of the first output voltage and the second output voltage and wherein the second response is the same as the first response when the first sum is less than the higher voltage;

comparing the first response to the second response, wherein a transistor pair of the first transistor and the second transistor is identified as unstable when the first response and the second response are different;

masking the transistor pair as unusable in authenticating the device in response to identifying the transistor pair as unstable;

recording the first response when the transistor pair is not identified as unstable;

wherein a drain of the first transistor is connected to a common drain voltage via a first resistor having a common resistance value, wherein the first output voltage includes a voltage across the first resistor when the reference voltage is applied to a gate of the first transistor; and wherein a drain of the second transistor is connected to the common drain voltage via a second resistor having the common resistance value, wherein the second output voltage includes a voltage across the second resistor when the reference voltage is applied to a gate of the second transistor.

16. The method of claim 15, further comprising:

sending a sequence of different challenges, wherein in response to each of the different challenges a different pair of transistors is selected;

collecting a first sequence of responses in response to the sequence of different challenges;

collecting a second sequence of responses in response to the sequence of different challenges;

comparing the first sequence of responses to the second sequence of responses, wherein a particular pair of transistors is identified as unstable when a corresponding portion of the first sequence of responses and a corresponding portion of the second sequence of responses are different;

masking the particular pair of transistors as unusable in authenticating the device in response to identifying the particular pair of transistors as unstable; and recording the corresponding portion of the first sequence of responses when the particular pair of transistors is not identified as unstable.

17. The method of claim 15, further comprising:

testing a reliability of the first response by determining whether the signal-first response changes in response to changes in operating conditions; and when the first response changes in response to the changes in operating conditions, masking the transistor and the second transistor pair as unusable in authenticating the device.

18. The method of claim 15, further comprising:

receiving a third response, wherein the third response differs from the first response when a second sum of a second offset voltage and the lower voltage is greater than or equal to the higher voltage, wherein the second offset voltage is larger than the first offset voltage, and wherein the third response is the same as the first response when the second sum is less than the higher voltage; and comparing the first response to the third response, wherein the transistor pair of the first transistor and second transistor is identified as unstable when the first response and the second response are different.

* * * * *